UNITED STATES PATENT OFFICE.

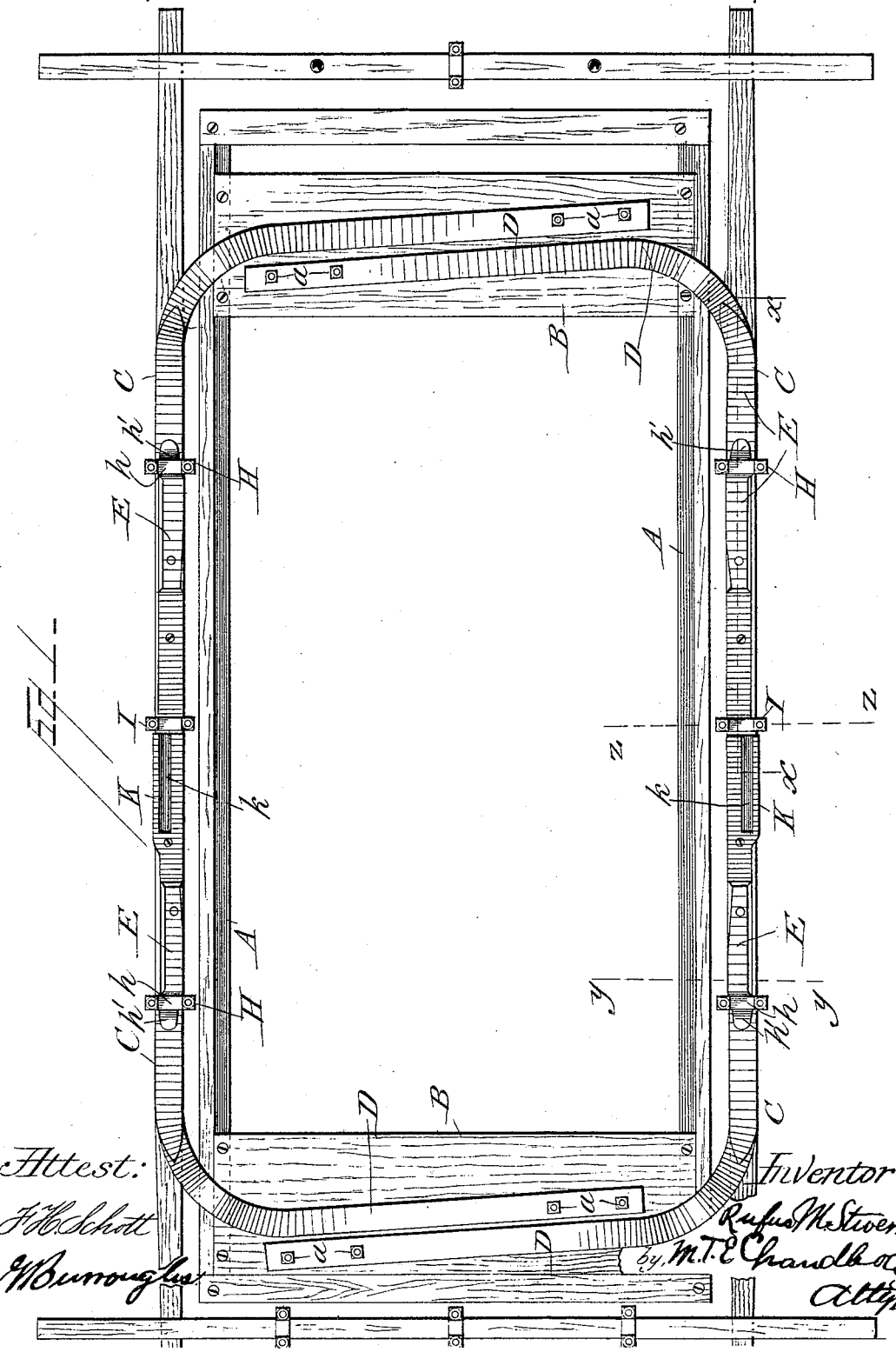

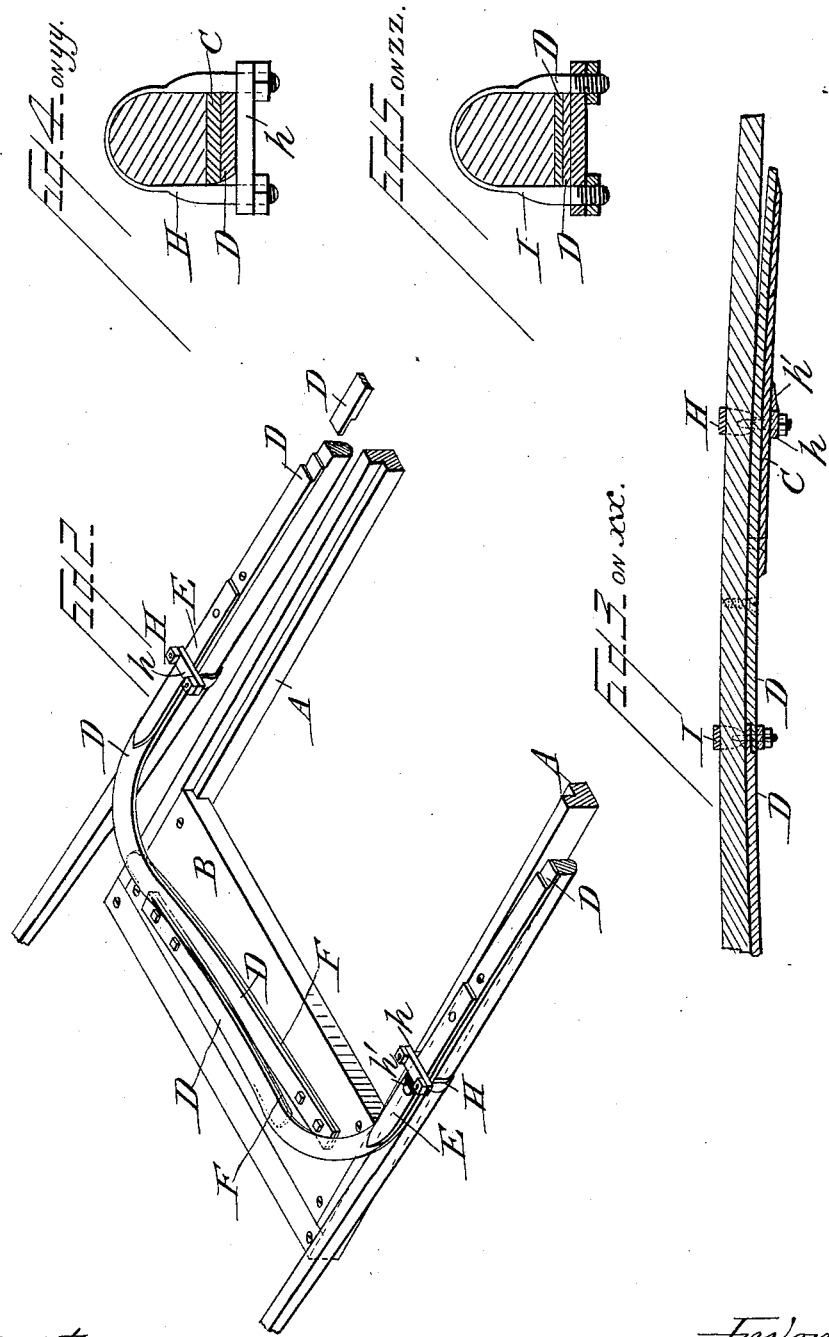

RUFUS M. STIVERS, OF NEW YORK, N. Y.

VEHICLE-SPRING.

SPECIFICATION forming part of Letters Patent No. 429,820, dated June 10, 1890.

Application filed March 18, 1890. Serial No. 344,440. (No model.)

*To all whom it may concern:*

Be it known that I, RUFUS M. STIVERS, a citizen of the United States, residing at New York, in the county of New York and State of New York, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to that class of vehicles in which the body-frame is supported upon semi-elliptical springs connected with side bars secured to the front and rear bolsters of the running-gear in the ordinary manner.

The invention consists in the employment of a spring which is formed of flat leaves and shaped to form nearly a quarter-circle. It is attached at one end midway of the side bar and continues in contact with the same for a short distance toward the end and then gradually leaves it. Where the spring first leaves the side bar, the spring is gradually bent downward a short distance, then inward and upward to the body-frame, where it is attached.

The invention further consists of the novel combination and arrangement of parts, as will be hereinafter more fully set forth, pointed out in the appended claims, and illustrated in the accompanying drawings.

In the accompanying drawings, in which similar letters of reference designate corresponding parts, Figure 1 is a reverse plan view showing the manner of attaching the body-frame to the side bars. Fig. 2 is a detail perspective view. Fig. 3 is a section on the line *x x* of Fig. 1. Fig. 4 is a sectional view on the line *y y* of Fig. 1. Fig. 5 is a similar view on the line *z z* of Fig. 1.

Referring to the drawings by letter, A represents the body-frame of the vehicle.

B B are supports beneath the ends of the body-frame, to which the ends of the springs are attached.

C C are the springs, secured at one end to the side bar and at the other end to one of the supports B. These springs are composed of the main leaf D and the short re-enforcing leaves E and F. The main leaf is secured at one end to the side bar by means of a suitable clip H, and at the other end, together with the re-enforcing leaf F, by means of the bolts *a a*, to the support B. This fastening to the support B is made on that end of the same which is opposite to the end on that side adjacent to the side bar to which the spring is attached. In passing from the side bar the main leaf gradually descends and then turns inward and upward to the body-frame. Midway of that part of the spring on which the side bar rests the re-enforcing leaf E is riveted. This leaf conforms with the main leaf and continues with the same a short distance beyond where it begins to turn inwardly.

On the opposite side of the main leaf, between its front end and the support to which it is secured, is secured the re-enforcing leaf D, which conforms and continues with the main leaf to the point where it begins to turn inward. These re-enforcing leaves make the spring as a whole stiffer at the places where it is necessary to be so and at the same time give it its greatest flexibility at the long gradual turns, thereby giving the easiest motion as is consistent with strength.

A clip H secures the spring just before it begins to leave the side bar to the same. The cross-plate *h* of the clip has a projection *h'*, which gives additional bearing-surface for the spring on the plate and serves to hold it more firmly in position. The ends of a front and a rear spring which meet on a side bar are recessed in such a way that one will overlap the other, (see Figs. 2 and 3,) and a clip I is fastened over the joint, securing the same firmly to the side bar.

The front end of the rear spring has a projection K, which forms a wear-plate for the wheel to strike against in turning the vehicle. The projection is made by forming the groove *k* and having the displaced metal forced to the outer edge of the spring.

The springs, when fastened in their respective places, together form a circular support for the body-frame on the side bars and in such a manner that it is free to rise and fall between the same. Springs when so constructed and secured give a much larger spring basis than those constructed on somewhat the same principle, but which are made of two semicircular sections instead of quadra-circular sections.

Owing to the larger spring basis, greater freedom from jolts and jars of the wheels is obtained, and being much more firmly secured to the different parts are less liable to become loosened. They can also be made much thicker and stronger without lessening their flexibility.

Having thus described my invention, what I claim, and desire to secure by Letters Patent, is—

1. In a vehicle-spring of the described class, the combination of the body-frame, the side bar, and the semi-elliptical quadra-circular spring, consisting of the main leaf and the re-enforcing leaves secured one at each end of the main leaf and on opposite sides of the same, substantially as specified.

2. In a vehicle-spring of the described class, the combination of the body-frame, the side bar, the semi-elliptical quadra-circular spring, consisting of the main leaf, the re-enforcing leaves secured one at each end of said main leaf and on opposite sides of the same, said spring being attached at one end to the side bar and at the other end to a support attached to the under side of the body-frame, said attachment being made near that end of the support farthest from the side bar to which the spring is attached, substantially as and for the purpose set forth.

3. In a vehicle-spring of the described class, the combination of the body-frame, the support secured to the under side of said frame, the side bar, the spring secured at one end to said side bar and continuing with the same for a short distance toward its end, then turning downward, then inward and upward to the support secured to the under side of the body-frame, being attached to the same at the end farthest from the side bar to which the other end of the spring is attached, said spring consisting of the main leaf, the re-enforcing leaf riveted on the under side of the main leaf near the end attached to the side bar, and the re-enforcing leaf secured to the other end on the upper side, substantially as and for the purpose specified.

In testimony whereof I affix my signature in presence of two witnesses.

RUFUS M. STIVERS.

Witnesses:
  FRANK CORSA,
  HENRY W. GEIS.